S. C. MAINE.
Fog-Signal.

No. 203,473. Patented May 7, 1878.

WITNESSES
C. W. Tutte
E. A. Stock.

INVENTOR
S. C. Maine
by J. H. Adams
Atty.

UNITED STATES PATENT OFFICE.

SEBEUS C. MAINE, OF BOSTON, MASSACHUSETTS, ASSIGNOR TO RUFUS H. SPAULDING, OF SAME PLACE.

IMPROVEMENT IN FOG-SIGNALS.

Specification forming part of Letters Patent No. 203,473, dated May 7, 1878; application filed March 11, 1876.

*To all whom it may concern:*

Be it known that I, SEBEUS C. MAINE, of Boston, in the county of Suffolk and State of Massachusetts, have invented an Improved Tidal Motor, of which the following is a specification:

My invention relates to an improvement in the method of utilizing the movement of the tide as a motor for machinery, with especial reference to a striking apparatus for sounding a signal-alarm.

The invention consists in the employment of a floating vessel, to be moored at or near any dangerous point for shipping, in which vessel is placed a system of machinery for sounding a signal-alarm, said machinery being operated by the action of the tide, in combination with a weight resting upon the bottom or bed of the water, and connected with the said machinery by means of a rope or chain passing down through the bottom of the vessel in which the machinery is placed.

Figure 1:
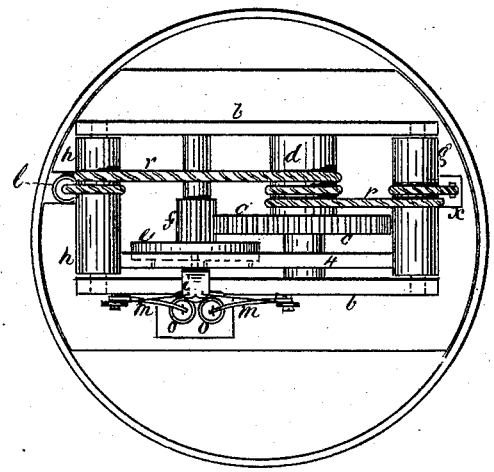
Figure 2:
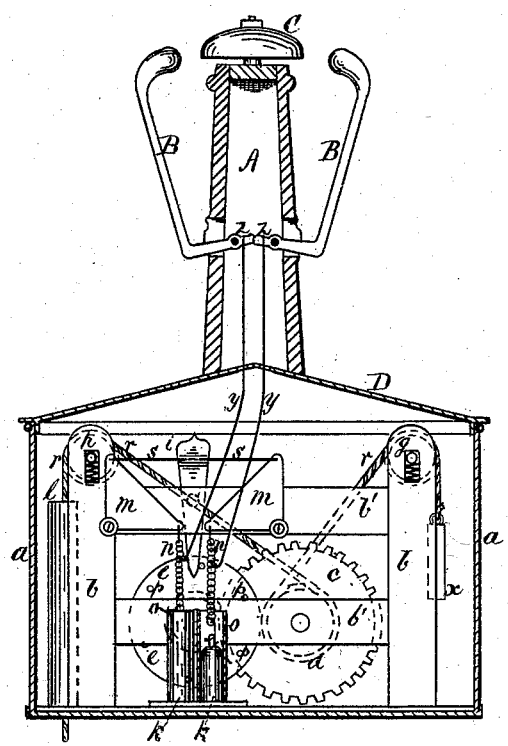

Referring to the drawings, Figure 1 represents a plan view of the operative mechanism; and Fig. 2, an elevation of the same, with the bell-tower in section.

$a$ represents the outer casing of a vessel containing the operative mechanism, shown in the drawing as of cylindrical form, but designed in practice to be of a hemispherical shape, or a floating vessel of the ordinary kind and of any desired size.

Within this casing is a frame, which may be made of wood or iron, and consisting of the uprights $b$ and cross-bars $b'$. In the lower cross-bars, transversely of the frame, is journaled a shaft, bearing a large gear-wheel, $c$, and a drum, $d$. (See Fig. 1.) To the left of the said shaft and wheel $c$ is also journaled another shaft, bearing a pinion, $f$, which gears with the cog-wheel $c$, as shown in Fig. 1; and on the same shaft with the pinion $f$, near the side of the frame, is secured a wheel or disk, $e$, provided with a series of pins or projections, $p$, on its front face, near the circumference.

To the inner side of the upper cross-bar $b'$ is pivoted a vertical lever, $i$, so as to turn freely to the right and left. To the upper portion of the lever $i$, on each side, are attached rods or wires $s\ s$, connecting with the upper ends of the triangular or bell-crank levers $m\ m$, having their fulcra in the lower side or edge of the upper cross-bar $b'$. To the lower free ends of the levers $m\ m$ are attached chains $n\ n$, which extend downward and into cylinders $o\ o$, secured to the bottom of the frame. On the lower ends of the chains $n\ n$ are attached weights $k\ k$, which rest on the bottom of the cylinders $o\ o$ when the lever $i$ is in a vertical position. One of these cylinders is represented as broken away, to show the inclosed weight $p$.

To the chains $n\ n$, a short distance below their attachment to the bell-crank levers $m\ m$, are attached the wires $y\ y$, which extend upward, and are secured to the striking levers or tongues at $z\ z$.

On the top of the vessel is secured a frame or tower, A, having on its top a bell or gong, C, which is struck by the levers B. Instead of being placed on the outside, as shown, the levers may be arranged to strike the bell or gong on the inside, the wires being arranged accordingly.

In order to secure the frame or tower A more firmly to the float, braces may extend from the top of the tower to the upper outer edges of the vessel.

In the top of the casing a man-hole, D, may be arranged, to admit of access to the working mechanism, when necessary.

Extending transversely across the upper part of the frame, at each end, are drums or rollers $g\ h$, over and around which the weighted ropes or chains are made to pass. The shafts of these rollers have their bearings upon springs, as shown, so as to allow the shafts to yield to any sudden jar or strain of the rope or chain caused by the action of the water.

Upon the drum $d$ is wound with one or more turns a rope or chain, $r$, which is carried up on the left-hand side with one or more turns on the roller or drum $h$, and from thence it extends down through a tube, $l$, which is open at the bottom, and firmly secured to the bottom of the casing.

To the end of the rope or chain is attached a heavy weight, $w$, which is designed to rest on the bed or bottom of the water. The other end of the rope or chain $r$ passes up from the drum $d$ with one or more turns around the roller or drum $g$, and to this end of the rope is suspended a weight, $x$, about half as heavy as the weight $w$, more or less, as may be found necessary.

Operation: The vessel being securely anchored in position, we will suppose the tide to be rising. The weight $w$, resting upon the bottom of the water, as the vessel rises with the tide sets in motion, through the drum $d$, the wheel $c$, acting upon the pinion $f$ to turn the disk or wheel $e$. The pins $p$, as the disk rotates, will successively move the lower end of the pivoted lever $i$, and, through the rod $s$ and bell-crank lever $m$, elevate the weight $k$ in one of the cylinders $o$. As the lower end of the pivoted lever $i$ passes over and is released from the projecting pin, the weight $k$ drops and pulls down the wire $y$, and causes the hammer or tongue B to strike the bell or gong C, the lower end of the wire $y$ being attached to the chain $n$. As the rope is wound around the drums the slack is taken up by the weight $x$ at the other end of the rope or chain. One or more pulleys may be arranged for the rope or chain to pass over after leaving the roller $g$, in case there is not sufficient depth for the weight $x$ to fall in taking up the slack.

When the tide falls the action of the mechanism is reversed, the weight $x$ being sufficient to turn the drums as the vessel falls with the tide.

In some forms of the machine it may be advisable to pass the rope which bears the heavier weight over the outside of the vessel instead of through the cylinder, as shown; and the small weight $x$ may, if desirable, be passed into a cylinder.

In case of the vessel being placed in a position where it will be subject to violent commotion of the water, so as to raise the heavier weight from the bottom, it will be advisable to arrange the coils of the chain or rope around the several drums in such a manner as to allow the rope or chain to slip on the drums, in order to obviate the liability of breaking the machinery by any sudden jar or strain.

As my apparatus requires no connection with the main land, the vessel may be moved to any isolated spot where a danger-signal is required, all that is necessary being a resting place for the heavier weight, the combined power of the tide and the unequal weights causing the machinery to move continually during both the rising and falling of the tide.

What I claim as my invention, and desire to secure by Letters Patent, is—

1. In combination with the floating vessel $a$, the drum $d$, mounted within said vessel and connected by suitable mechanism to a signaling apparatus, a weight, $w$, adapted to rest on the bed of the water, a chain passing around the drum and connected at one end to the weight $w$ and at the other end to a movable counter-weight, $x$, substantially as described, for the purpose specified.

2. The combination of the disk $e$, provided with the pins $p$, the pivoted lever $i$, and the weighted bell-crank levers $m\, m$, as and for the purpose described.

3. The combination of the weighted levers $m\, m$, the connecting-wires $y\, y$, and the striking apparatus B C attached to the frame A, as and for the purpose specified.

In testimony whereof I have signed my name to this specification in the presence of two subscribing witnesses.

S. C. MAINE.

Witnesses:
   Jos. H. Adams,
   E. A. Stock.